US012775795B2

(12) United States Patent
Bae et al.

(10) Patent No.: US 12,775,795 B2
(45) Date of Patent: Oct. 27, 2026

(54) TEXT DATA-BASED METHOD AND SYSTEM FOR DEDUCING SOCIAL IMPACT

(71) Applicant: Pusan National University Industry-University Cooperation Foundation, Busan (KR)

(72) Inventors: Hye Rim Bae, Busan (KR); Minseop Kim, Busan (KR); JaeHyeon Heo, Busan (KR); Dohee Kim, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 375 days.

(21) Appl. No.: 18/475,214

(22) Filed: Sep. 27, 2023

(65) Prior Publication Data

US 2024/0135101 A1 Apr. 25, 2024

(30) Foreign Application Priority Data

Oct. 14, 2022 (KR) ........................ 10-2022-0132276

(51) Int. Cl.
*G06F 40/279* (2020.01)
*G06F 40/232* (2020.01)

(52) U.S. Cl.
CPC .......... *G06F 40/279* (2020.01); *G06F 40/232* (2020.01)

(58) Field of Classification Search
CPC .... G06F 40/279; G06F 40/232; G06F 16/951; G06F 40/10; G06F 40/268; G06Q 50/26; G06Q 10/04
See application file for complete search history.

(56) References Cited

U.S. PATENT DOCUMENTS 7,805,291 B1 * 9/2010 Berkowitz .............. G06F 40/30 704/9
2004/0230577 A1 * 11/2004 Kawatani ................ G06F 18/23
2014/0189536 A1 * 7/2014 Lange ................... G06F 16/248 709/204
2015/0220639 A1 * 8/2015 Lawyer ................. G06F 16/951 707/728
2016/0239581 A1 * 8/2016 Jaidka ..................... H04L 51/52
(Continued)

FOREIGN PATENT DOCUMENTS

JP 2007041700 A 2/2007
JP 2012059182 A 3/2012
(Continued)

OTHER PUBLICATIONS

Aiello, L. M., Petkos, G., Martin, C., Corney, D., Papadopoulos, S., Skraba, R., . . . & Jaimes, A. (2013). Sensing trending topics in Twitter. IEEE Transactions on multimedia, 15(6), 1268-1282. (Year: 2013).*

(Continued)

*Primary Examiner* — Philip H Lam
(74) *Attorney, Agent, or Firm* — CANTOR COLBURN LLP

(57) ABSTRACT

Disclosed are a text data-based method and system for deducing a social impact. One or more embodiments relate to a text data-based method and system for deducing a social impact, which calculates a digitized variable, a PageRank Mean Absolute Sum (PR-MAS), for identifying a change over time in the importance of nouns in regularly collected text data.

15 Claims, 9 Drawing Sheets

Attention Set (310)

| | | | | | |
|---|---|---|---|---|---|
| 2019/Feb/Week(1st) | Resident<br>Unit cost | New year<br>Construction | Kick-off<br>Factory | Antwerp<br>Used car | Arrear<br>Slowdown |
| 2020/Feb/Week(4th) | New variant<br>Bidding | Quarantine<br>Judgment | Medical treatment<br>Defense | Insect-proofing<br>Pirate | S<br>Corruption |
| 2021/Apr/Week(4th) | COVID-19<br>POSCO | Crises<br>Truck | Basic industry<br>Parcels van | Solidarity<br>Equality | Order<br>Ranking |
| 2021/Mar/Week(4th) | COVID-19<br>Robot | Suez<br>Neutrality | Canal<br>Naver | Delivery<br>Shinsegae | Carbon<br>Application |

Adjacency Matrix (320)

| | **COVID-19** | POSCO | Truck | Parcels van | **Crises** | Equality | Basic industry | Ranking | Order | Solidarity |
|---|---|---|---|---|---|---|---|---|---|---|
| **COVID-19** | 56.0 | 3.0 | 2.0 | 0.0 | 33.0 | 1.0 | 15.0 | 6.0 | 6.0 | 6.0 |
| POSCO | 3.0 | 18.0 | 0.0 | 0.0 | 9.0 | 0.0 | 0.0 | 0.0 | 0.0 | 0.0 |
| Truck | 2.0 | 0.0 | 12.0 | 9.0 | 1.0 | 0.0 | 0.0 | 0.0 | 0.0 | 3.0 |
| Parcels van | 0.0 | 0.0 | 9.0 | 6.0 | 0.0 | 0.0 | 0.0 | 0.0 | 0.0 | 0.0 |
| **Crises** | 33.0 | 9.0 | 1.0 | 0.0 | 22.0 | 0.0 | 9.0 | 0.0 | 3.0 | 3.0 |
| Equality | 1.0 | 0.0 | 0.0 | 0.0 | 0.0 | 6.0 | 0.0 | 0.0 | 3.0 | 0.0 |
| Basic industry | 15.0 | 0.0 | 0.0 | 0.0 | 9.0 | 0.0 | 12.0 | 0.0 | 0.0 | 0.0 |
| Ranking | 6.0 | 0.0 | 0.0 | 0.0 | 0.0 | 0.0 | 0.0 | 12.0 | 0.0 | 0.0 |
| Order | 6.0 | 0.0 | 0.0 | 0.0 | 3.0 | 3.0 | 0.0 | 0.0 | 6.0 | 0.0 |
| Solidarity | 6.0 | 0.0 | 3.0 | 0.0 | 3.0 | 0.0 | 0.0 | 0.0 | 0.0 | 12.0 |

(56) References Cited

U.S. PATENT DOCUMENTS

| | | | | |
|---|---|---|---|---|
| 2017/0060997 | A1* | 3/2017 | Lee | G06F 16/355 |
| 2022/0129921 | A1* | 4/2022 | Shahsavari | G06F 16/35 |

FOREIGN PATENT DOCUMENTS

| | | | |
|---|---|---|---|
| KR | 20020015838 | A | 3/2002 |
| KR | 20020072092 | A | 9/2002 |
| KR | 20140146439 | A | 12/2014 |
| KR | 101702559 | B1 | 2/2017 |
| KR | 102126911 | B1 | 7/2020 |
| KR | 20200109417 | A | 9/2020 |

OTHER PUBLICATIONS

Suh, J. H. (2019). SocialTerm-Extractor: Identifying and predicting social-problem-specific key noun terms from a large number of online news articles using text mining and machine learning techniques. Sustainability, 11(1), 196. (Year: 2019).*

De Melo, T., & Figueiredo, C. M. (2021). Comparing news articles and tweets about Covid-19 in Brazil: sentiment analysis and topic modeling approach. JMIR Public Health and Surveillance, 7(2), e24585. (Year: 2021).*

Bernabé-Moreno, J., Tejeda-Lorente, A., Porcel, C., & Herrera-Viedma, E. (2015). A new model to quantify the impact of a topic in a location over time with Social Media. Expert Systems with Applications, 42(7), 3381-3395. (Year: 2015).*

* cited by examiner

Attention Set (310)

| | | | | | |
|---|---|---|---|---|---|
| 2019/Feb/Week($1^{st}$) | Resident<br>Unit cost | New year<br>Construction | Kick-off<br>Factory | Antwerp<br>Used car | Arrear<br>Slowdown |
| 2020/Feb/Week($4^{th}$) | New variant<br>Bidding | Quarantine<br>Judgment | Medical treatment<br>Defense | Insect-proofing<br>Pirate | S<br>Corruption |
| 2021/Apr/Week($4^{th}$) | COVID-19<br>POSCO | Crises<br>Truck | Basic industry<br>Parcels van | Solidarity<br>Equality | Order<br>Ranking |
| 2021/Mar/Week($4^{th}$) | COVID-19<br>Robot | Suez<br>Neutrality | Canal<br>Naver | Delivery<br>Shinsegae | Carbon<br>Application |

Adjacency Matrix (320)

| | **COVID-19** | POSCO | Truck | Parcels van | **Crises** | Equality | Basic industry | Ranking | Order | Solidarity |
|---|---|---|---|---|---|---|---|---|---|---|
| **COVID-19** | 56.0 | 3.0 | 2.0 | 0.0 | 33.0 | 1.0 | 15.0 | 6.0 | 6.0 | 6.0 |
| POSCO | 3.0 | 18.0 | 0.0 | 0.0 | 9.0 | 0.0 | 0.0 | 0.0 | 0.0 | 0.0 |
| Truck | 2.0 | 0.0 | 12.0 | 9.0 | 1.0 | 0.0 | 0.0 | 0.0 | 0.0 | 3.0 |
| Parcels van | 0.0 | 0.0 | 9.0 | 6.0 | 0.0 | 0.0 | 0.0 | 0.0 | 0.0 | 0.0 |
| **Crises** | 33.0 | 9.0 | 1.0 | 0.0 | 22.0 | 0.0 | 9.0 | 0.0 | 3.0 | 3.0 |
| Equality | 1.0 | 0.0 | 0.0 | 0.0 | 0.0 | 6.0 | 0.0 | 0.0 | 3.0 | 0.0 |
| Basic industry | 15.0 | 0.0 | 0.0 | 0.0 | 9.0 | 0.0 | 12.0 | 0.0 | 0.0 | 0.0 |
| Ranking | 6.0 | 0.0 | 0.0 | 0.0 | 0.0 | 0.0 | 0.0 | 12.0 | 0.0 | 0.0 |
| Order | 6.0 | 0.0 | 0.0 | 0.0 | 3.0 | 3.0 | 0.0 | 0.0 | 6.0 | 0.0 |
| Solidarity | 6.0 | 0.0 | 3.0 | 0.0 | 3.0 | 0.0 | 0.0 | 0.0 | 0.0 | 12.0 |

Count = Link Frequency : (LF(i))

Sum = Noun Frequency : (NF(i) ≤ 3)

FIG. 3

| NF-LF Weight : (NFLF(i)) (410) | | | |
|---|---|---|---|
| **COVID-19** | **5.547** | Basic industry | 0.594 |
| **Crises** | **1.930** | Order | 0.375 |
| POSCO | 0.891 | Ranking | 0.375 |
| Truck | 0.870 | Equality | 0.297 |
| Solidarity | 0.750 | Parcels van | 0.187 |

NF-LF Adjacency Matrix (420)

| | COVID-19 | POSCO | Truck | Parcels van | Crises | Equality | Basic industry | Ranking | Order | Solidarity |
|---|---|---|---|---|---|---|---|---|---|---|
| COVID-19 | 310.652 | 16.642 | 11.094 | 0.000 | 183.063 | 5.547 | 83.210 | 33.284 | 33.284 | 33.284 |
| POSCO | 2.674 | 16.047 | 0.000 | 0.000 | 8.023 | 0.000 | 0.000 | 0.000 | 0.000 | 0.000 |
| Truck | 1.741 | 0.000 | 10.448 | 7.836 | 0.870 | 0.000 | 0.000 | 0.000 | 0.000 | 2.612 |
| Parcels van | 0.000 | 0.000 | 1.680 | 1.125 | 0.000 | 0.000 | 0.000 | 0.000 | 0.000 | 0.000 |
| Crises | 63.695 | 17.370 | 1.930 | 0.000 | 42.461 | 0.000 | 17.370 | 0.000 | 5.790 | 5.790 |
| Equality | 0.297 | 0.000 | 0.000 | 0.000 | 0.000 | 1.783 | 0.000 | 0.000 | 0.891 | 0.000 |
| Basic industry | 8.915 | 0.000 | 0.000 | 0.000 | 5.349 | 0.000 | 7.132 | 0.000 | 0.000 | 0.000 |
| Ranking | 2.250 | 0.000 | 0.000 | 0.000 | 0.000 | 0.000 | 0.000 | 4.500 | 0.000 | 0.000 |
| Order | 2.250 | 0.000 | 0.000 | 0.000 | 1.125 | 1.125 | 0.000 | 0.000 | 2.250 | 0.000 |
| Solidarity | 4.500 | 0.000 | 2.250 | 0.000 | 2.250 | 0.000 | 0.000 | 0.000 | 0.000 | 9.000 |

FIG. 4

500

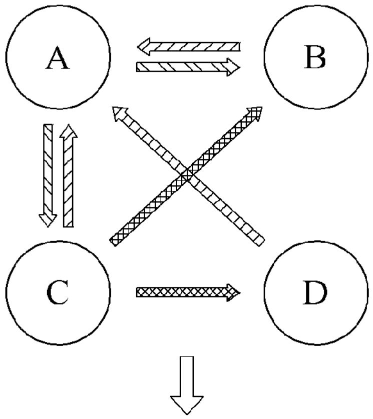

$$\underbrace{[0.25\ \ 0.25\ \ 0.25\ \ 0.25]}_{\text{Initial PageRank Score } \underline{501}} \underbrace{\begin{bmatrix} 0 & 0.5 & 0.5 & 0 \\ 1 & 0 & 0 & 0 \\ 0.33 & 0.33 & 0 & 0.33 \\ 1 & 0 & 0 & 0 \end{bmatrix}}_{\text{Probability Matrix } \underline{510}} = \underset{\text{Update } \underline{502}}{[0.582\ \ 0.208\ \ 0.125\ \ 0.083]}$$

$$\underset{\underline{502}}{[0.582\ \ 0.208\ \ 0.125\ \ 0.083]} \begin{bmatrix} 0 & 0.5 & 0.5 & 0 \\ 1 & 0 & 0 & 0 \\ 0.33 & 0.33 & 0 & 0.33 \\ 1 & 0 & 0 & 0 \end{bmatrix} = \underset{\underline{503}}{[0.331\ \ 0.332\ \ 0.291\ \ 0.041]}$$

$$\underset{\underline{503}}{[0.331\ \ 0.332\ \ 0.291\ \ 0.041]} \begin{bmatrix} 0 & 0.5 & 0.5 & 0 \\ 1 & 0 & 0 & 0 \\ 0.33 & 0.33 & 0 & 0.33 \\ 1 & 0 & 0 & 0 \end{bmatrix} = [\dots\ \dots\ \dots\ \dots]$$

Repeat until PageRank Converge

FIG. 5

| PageRank Score (610) | | | | |
|---|---|---|---|---|
| COVID-19 | Crises | Basic industry | Truck | POSCO |
| **0.536** | **0.220** | 0.052 | 0.045 | 0.029 |
| Solidarity | Order | Parcels van | Ranking | Equality |
| 0.029 | 0.026 | 0.025 | 0.020 | 0.019 |

700

810

820

| | SCFI index(A) | SCFI index + PR-MAS(A+B) |
|---|---|---|
| Mean Squared Error (MSE) | 606.48 | **392.37** |
| Mean Absolute Error (MAE) | 18128.44 | **11788.80** |

TEXT DATA-BASED METHOD AND SYSTEM FOR DEDUCING SOCIAL IMPACT

CROSS-REFERENCE TO RELATED APPLICATION(S)

This application claims the priority benefit of Korean Patent Application No. 10-2022-0132276 filed on Oct. 14, 2022, in the Korean Intellectual Property Office, the disclosure of which is incorporated herein by reference for all purposes.

STATEMENT

This work was supported by the National Research Foundation of Korea (NRF) grant funded by the Korea government (MSIT) (No. RS-2023-00218913).

BACKGROUND

1. Field

One or more embodiments relate to a text data-based method and system for deducing a social impact, which calculates a digitized variable, a PageRank Mean Absolute Sum (PR-MAS), for identifying a change over time in the importance of nouns in regularly collected text data.

In this case, the 'social impact' refers to an index indicating a degree to which words (nouns) having a social impact are used in text data collected for a certain period compared to the past.

2. Description of Related Art

Most machine learning and deep learning models are trained based on quantitative data, and thus there have been many studies to convert qualitative data into quantitative data and use it for training.

Specifically, there are various studies to convert text data of Internet news articles reflecting the trend, atmosphere, and psychological factors of the society, which is representative qualitative data, into quantitative data.

For this, a typical technology, for example, a term frequency-inverse document frequency (hereinafter, "TF-IDF") technology, is being used.

The TF-IDF technology is an algorithm used in information searches and text mining for obtaining a weight (importance) of a word and is mainly used to extract a keyword of a document, determine a rank of search results, or the like.

However, since the TF-IDF technology calculates importance by using collected documents, it may not readily calculate the importance and influence of words changed in documents that are newly collected every week or every month.

In other words, the TF-IDF technology is limited as to figuring out a degree to which the importance of a word changes over time, and, when a certain word affects many documents, determining the importance (the external influence of nouns) of the certain word.

Accordingly, to overcome the limits of the TF-IDF technology, the present disclosure proposes a noun frequency-link frequency (hereinafter, "NF-LF") technology based on graph theory, which may grasp the importance, changing over time, of words.

SUMMARY

An aspect provides technology for deducing a quantified value, a PageRank Mean Absolute Sum (PR-MAS), of external impact possibly occurring across a society by extracting a keyword of highly important words in text changing over time, which is not considered by a typically proposed model, and applying a weight to the extracted keywords for digitization.

Another aspect also provides technology for effectively extracting information related to an event having social impact or a social atmosphere from text data (news articles) that is continuously generated over time by improving the limits of a typical term frequency-inverse document frequency (TF-IDF) technology and using 1) the importance of words that changes over time and 2) a weight that changes according to a linking state between words, such as a word linked to an important word or a word linked to an unimportant word.

Another aspect also provides a noun frequency-link frequency (NF-LF) technology for deducing a social impact, a PR-MAS, of nouns by using an NF and an LF, in which the NF is a frequency of each noun appearing in text data collected during a set period, and the LF is the number of links between nouns according to a frequency of a noun appearing together.

According to an aspect, there is provided a text data-based method for deducing a social impact including constructing a base set including nouns extracted from text data by preprocessing the text data collected for a certain period among a whole predetermined period, constructing a compare set including nouns extracted from the first text data by preprocessing the first text data collected for a certain period after constructing the base set, constructing an attention set by selecting a noun to be noted during a collection period of the first text data from the compare set based on the base set, and deducing a numerical value, a PR-MAS, of social impact, that is, an index indicating a degree to which a noun associated with an event having social impact is used for the collection period of the first text data by using the attention set.

According to another aspect, there is also provided a text data-based system for deducing a social impact including a preprocessing part configured to construct a base set including nouns extracted from text data by preprocessing the text data collected for a certain period among a whole predetermined period and construct a compare set including nouns extracted from first text data by preprocessing the first text data collected for a certain period after constructing the base set, an attention part configured to construct an attention set by selecting a noun to be noted during a collection period of the first text data from the compare set based on the base set, and an extraction part configured to deduce a numerical value, a PR-MAS, of social impact, that is, an index indicating a degree to which a noun associated with an event having social impact is used for the collection period of the first text data by using the attention set.

According to an aspect, by improving the limits of a previously proposed TF-IDF technology, words (nouns) associated with an event having social impact or a social atmosphere may be extracted from text data by using a time-variant feature, and a weight for a link between words may be assigned according to importance.

According to another aspect, a weight of words appearing in regularly collected text data may be classified and calculated according to importance, and by using the weight, a quantified value, a PR-MAS, of external impact possibly occurring across the society may be deduced.

According to another aspect, a digitized variable, a PR-MAS, for considering market psychology or a social atmosphere by using the importance of words may be provided.

According to another aspect, when applying a PR-MAS to a neural network, Shanghai Containerized Freight Index (SCFI) prediction accuracy is verified to increase by about 50%.

According to another aspect, by using a whole news article set, which is qualitative and atypical data, nouns changing over time and having high impact may be extracted, and the social impact (influence) of the nouns may be deduced.

According to another aspect, nouns having the highest influence in a week may be extracted as a keyword through news articles.

The technical aspects proposed in the present disclosure may be directly used in finance, logistics, maritime transport, and other such fields that require prediction of and a preemptive response to market psychology, a social atmosphere, and other external impacts and may be demanded since studies for measuring market psychology by using atypical materials, such as news articles or social networking services (SNS), are actively underway to predict a container freight index, specifically, in maritime transport.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 3 is a diagram illustrating an example of constructing an attention set and an adjacency matrix in the text data-based system for deducing a social impact according to an embodiment;

FIG. 4 is a diagram illustrating an example of adjusting an adjacency matrix by using a noun frequency-link frequency (NF-LF) weight in the text data-based system for deducing a social impact according to an embodiment;

FIG. 5 is a diagram illustrating a PageRank algorithm in the text data-based system for deducing a social impact according to an embodiment;

DETAILED DESCRIPTION

Figure 1:
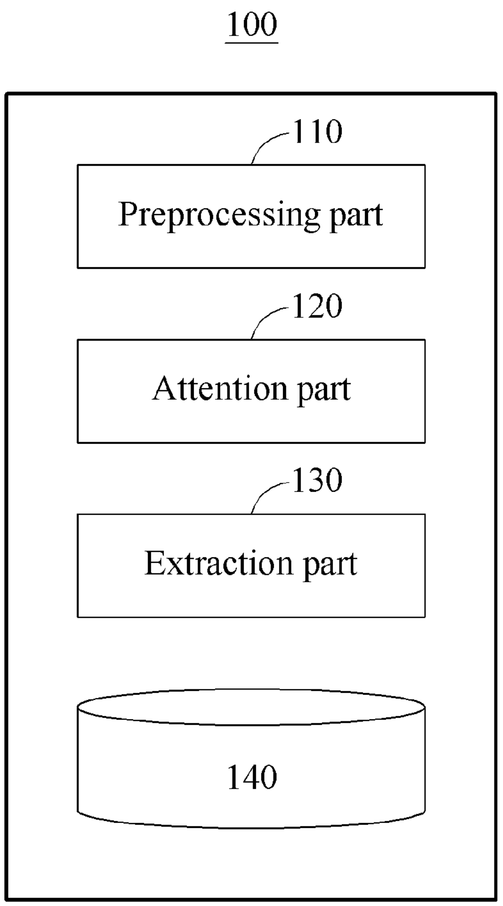
FIG. 1 is a block diagram illustrating a configuration of a text data-based system for deducing a social impact according to an embodiment.

Hereinafter, examples will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

FIG. 1 is a block diagram illustrating a configuration of a text data-based system for deducing a social impact according to an embodiment.

Referring to FIG. 1, a text data-based system 100 for deducing a social impact may include a preprocessing part 110, an attention part 120, an extraction part 130, and a database 140.

The preprocessing part 110 may preprocess text data collected for a certain period in the database 140 and may construct a base set including nouns extracted from the text data.

For example, the preprocessing part 110 may correct spelling and spacing for each text data collected for the certain period by using a tool for removing a punctuation mark and a tool for processing a natural language and may tag a part of speech by using the tool for processing a natural language on each word in text data that is corrected.

In addition, the preprocessing part 110 may extract nouns from among words tagged with a part of speech, may count an appearance frequency of the extracted nouns in the text data, may select a certain number of nouns in an order from a noun having the highest appearance frequency among the extracted nouns, and may construct the base set.

In the base set, the appearance frequency, in the text data, of each noun selected (extracted) from the text data may be recorded together.

In addition, the preprocessing part 110 may construct a compare set including nouns extracted from first text data by preprocessing the first text data collected for a certain period after constructing the base set.

For example, the preprocessing part 110 may construct the compare set whenever the first text data is collected for the certain period after constructing the base set.

Specifically, the preprocessing part 110 may correct spelling and spacing for the first text data by using the tool for removing a punctuation mark and the tool for processing a natural language, may tag a part of speech by using the tool for processing a natural language on each word in the first text data that is corrected, extract nouns from among words tagged with a part of speech, may count an appearance frequency of the extracted nouns in the first text data, may select a certain number of nouns in an order from a noun having the highest appearance frequency, and through this preprocessing process, may construct the compare set.

In the compare set, an appearance frequency of each noun, in the first text data, selected (extracted) from the first text data collected regularly, such as weekly or monthly, may be recorded together.

The attention part 120 may construct an attention set by selecting a noun to be noted during the collection period of the first text data from the compare set based on the base set.

For example, the attention part 120 may verify whether a first noun included in the compare set is also included in the base set and may select the first noun as the noun to be noted when the first noun is not included in the base set.

For another example, the attention part 120, when the first noun included in the compare set is also included in the base set, may verify whether an appearance frequency, recorded in the compare set, of the first noun exceeds an appearance frequency, recorded in the base set, of the first noun by a reference value or more, and when the appearance frequency recorded in the compare set exceeds the appearance frequency recorded in the base set by the reference value or more, may select the first noun as the noun to be noted.

In this case, when the first noun included in the compare set is also included in the base set, the attention part 120 may select the first noun as the noun to be noted when the appearance frequency, recorded in the compare set, of the first noun is determined to be an outlier provided in the '3 sigma rule'.

Specifically, the attention part 120 may calculate an average and a standard deviation by using the appearance frequency, recorded in the base set, of the first noun, may calculate a minimum reference value when the appearance frequency of the first noun is determined to be the outlier by applying a sigma coefficient (generally, '2' or '3') provided in the '3 sigma rule' according to {(average)−(standard deviation*sigma coefficient)}, and may select the first noun as the noun to be noted when the appearance frequency, recorded in the compare set, of the first noun exceeds the minimum reference value (determined to be the outlier).

The extraction part 130 may deduce a numerical value, a PageRank Mean Absolute Sum (PR-MAS), of social impact, that is, an index indicating a degree to which a noun associated with an event having social impact is used for the collection period of the first text data by using the attention set.

For example, the extraction part 130 may determine the attention set by extracting a certain number (e.g., 10) of nouns NA in an order from a noun having the highest appearance frequency in the first text data among nouns in the attention set constructed by the attention part 120.

In this case, the attention set (AS) may be a space for maintaining a noun to be used for analysis to deduce a social impact during the collection period (week/month) of the first text data among nouns in the compare set (CS) constructed whenever the first text data is collected regularly (weekly/monthly) and a frequency (how many times the noun is mentioned) of the noun.

The extraction part 130 may generate an adjacency matrix by counting the frequency of a noun in a row and a noun in a column appearing together in the first text data and having the counted frequency as a value of the row and the column when arranging the certain number of nouns NA of the determined AS in the row and the column and may deduce the numerical value, the PR-MAS, of social impact by using the adjacency matrix.

In this case, by using a noun frequency-link frequency (NF-LF) technology proposed in the present disclosure, the extraction part 130 may calculate an NF-LF weight for each of the certain number of nouns NA and may deduce the numerical value, the PR-MAS, of social impact from an NF-LF adjacency matrix obtained by adjusting the adjacency matrix through the NF-LF weight.

The 'social impact' herein may refer to an index indicating a degree to which words (nouns) having social impact are used in text data collected for a certain period compared to the past.

Specifically, the extraction part 130 may calculate a total NF, that is, a total appearance frequency of each noun NA, in the first text data by applying an NF function to each noun NA in the adjacency matrix.

In addition, the extraction part 130 may calculate an LF with another noun NA appearing together with each noun NA among the certain number of nouns NA in the first text data by applying an LF function to each noun NA in the adjacency matrix.

Then, the extraction part 130 may calculate the NF-LF weight for each of the certain number of nouns NA by dividing a multiplication of the total NF calculated for each noun NA with the LF by the number of the first text data according to Equation 1 below.

$$NFLF(i) = \frac{LF(i) * NF(i)}{\text{sum of documents}} \quad \text{Equation 1}$$

Here, NF(i) denotes a total appearance frequency of each noun i, LF(i) denotes an LF between other nouns appearing together with each noun i, and NFLF(i) denotes an NF-LF weight for each noun i.

The extraction part 130 may generate the NF-LF adjacency matrix by combining the NF-LF weight with the adjacency matrix through matrix multiplication.

The NF-LF adjacency matrix may be adjusted by the NF-LF weight such that a frequency (the number of links) of a noun linked to an important noun (e.g., "COVID-19") in the adjacency matrix may increase, and a frequency (the number of links) of a noun linked to an unimportant noun (e.g., "order") may decrease.

For example, the extraction part 130, by combining an adjacency matrix 320 of FIG. 3 with a weight 410 using an NF and an LF of FIG. 4, a frequency (that is, the number of links from "COVID-19"→"crisis"), '33.0', of "COVID-19", which is an important noun having a high appearance frequency in a whole article (the first text data), appearing together with a noun "crisis" may increase to '183.063', like an NF-LF adjacency matrix 420 of FIG. 4, however, a frequency (that is, the number of links from "order"→"crisis"), '3.0', of "order", which is an unimportant noun having a relatively low appearance frequency, appearing together with the noun "crisis" may rather decrease to '1.125', like the NF-LF adjacency matrix 420 of FIG. 4.

The extraction part 130 may calculate a PageRank score for each of the certain number of nouns NA by applying a PageRank algorithm to the NF-LF adjacency matrix adjusted by the NF-LF weight. The process of applying the PageRank algorithm is described below with reference to FIG. 5.

Then, the extraction part 130 may deduce, as the numerical value, the PR-MAS, of social impact, a sum of a value obtained by applying an absolute value to a value obtained by subtracting an average value of PageRank scores respectively of nouns NA from a PageRank score of each noun NA according to Equation 2 below.

$$PR-MAS=\sum_{i=1}^{\{Score\in PR\}}|\text{Score}-\mu(PR)| \quad \text{Equation 2}$$

Here, PR denotes a PageRank score set, Score denotes a PageRank score of each noun, and denotes an average value of PageRank scores of all nouns.

A greater PR-MAS value may indicate that a word having greater social influence (impact) is mentioned during the collection period (4th week of April 2021, etc.) of the first text data.

As described above, by using the NF-LF technology proposed by the present disclosure, the limits of a term frequency-inverse document frequency (TF-IDF) technology, which is the prior art, may be overcome by calculating the importance of a simple word based on a PR-MAS technique and an effect of adjusting the number of words (nouns) being mentioned according to importance, not the absolute quantity of words (nouns) being mentioned: the importance of words over time may be identified from news articles including neutral words, which may not be performed by the conventional TF-IDF, an external influence (=social impact) of the words may be extracted based on the identified importance, and the importance may be maintained even when the words appear in various documents.

Figure 2:
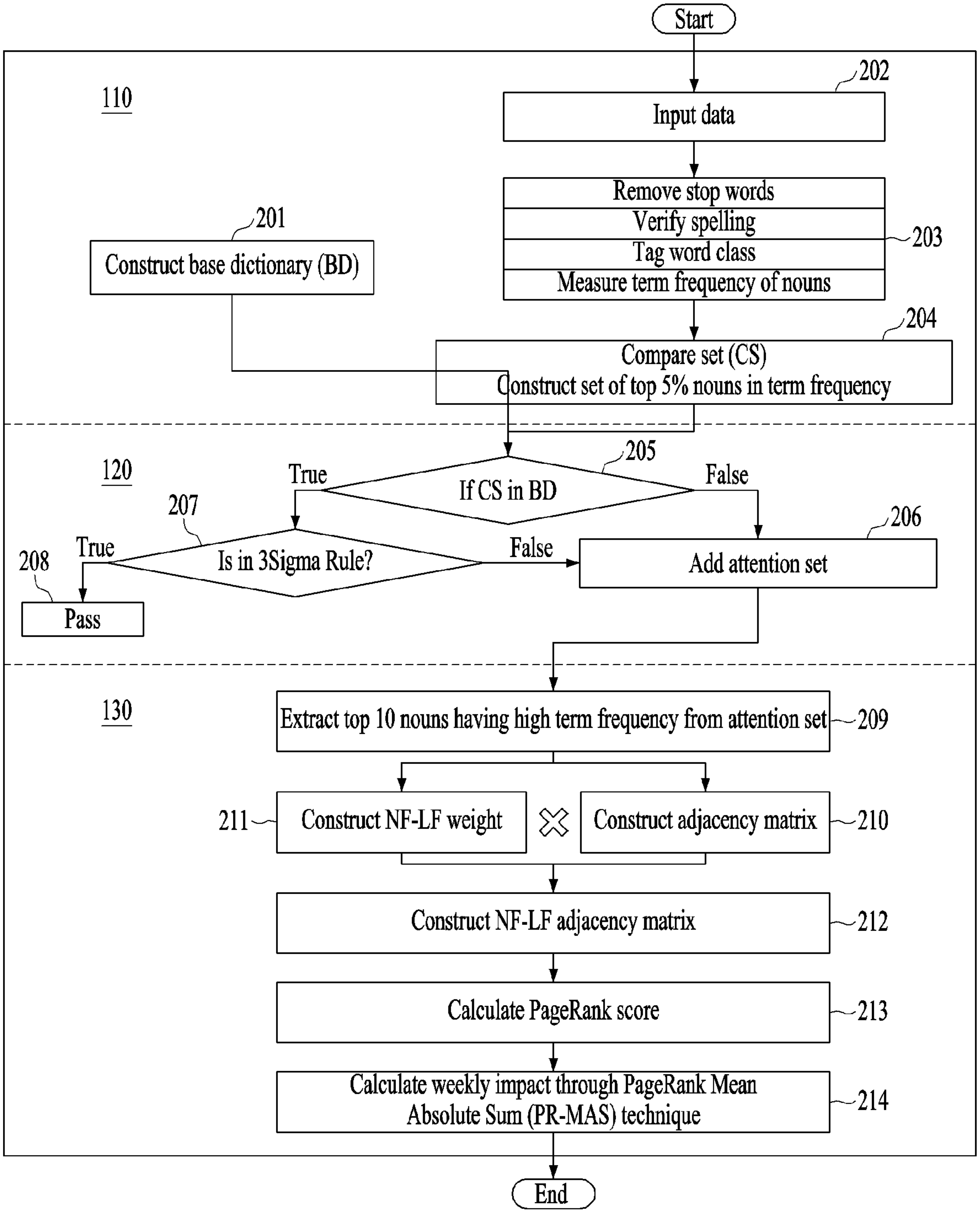
FIG. 2 is a flowchart illustrating an order of a text data-based method of deducing a social impact according to an embodiment.

FIG. 2 is a flowchart illustrating an order of a text data-based method of deducing a social impact according to an embodiment.

Referring to FIG. 2, in operation 201, a preprocessing part 110 may refine text data written during a set period in the past and may construct a base dictionary (hereinafter, a base set (BS)).

For example, the preprocessing part 110 may collect articles (previous articles) written during a certain period in the past when an event, such as the 'COVID-19 pandemic', having great social impact has not occurred, may perform data preprocessing, such as stop word removal, spelling/spacing correction, word class tagging, or term frequency measurement, on the collected previous articles, may extract nouns in top 5% from those having the highest frequency among all nouns appearing in the previous articles, and may construct the BS including the extracted nouns and their frequency (how many times the nouns are mentioned).

Then, when new text data is input in operation 202, the preprocessing part 110 may perform the data preprocessing on the new text data that is input and may construct a CS in operations 203 and 204.

In this case, unlike the BS that is constructed once at the beginning, the CS may be constructed for every text data that is regularly collected such that a change, over time, of words appearing therein may be identified.

For example, to digitize and deduce a social impact by periods according to the degree to which words (nouns) associated with an event (e.g., the COVID-19 pandemic, etc.) having great social impact or a social atmosphere (e.g., femicide crimes, etc.) appear, the preprocessing part 110 may regularly collect webpage articles every week as the text data and may perform data preprocessing, such as stop word removal, spelling/spacing correction, word class tagging, or the measurement of term frequency (how many times words are mentioned) of the words of which a part of speech is a noun, on the articles collected every week.

Specifically, the preprocessing part 110 may remove punctuation marks, such as !, #, or %, as stop words from the collected articles and may check and correct the spelling and spacing of the collected articles by using a deep learning model or the "KoSpacing" model or the like, which is one of the Korean natural language processing (NLP) tools.

In addition, the preprocessing part 110 may tag parts of speech, such as a noun, a verb, or an adjective, on each of the words in the collected articles by using the "KoNLPy" model, which is one of the Korean NLP tools, and then may count the frequency of words of which a part of speech is a noun, among the words, appearing in the collected articles.

The preprocessing part 110 may extract a certain number of nouns in the approximately top 5% from a noun having the highest frequency from the collected articles and may maintain the extracted nouns in the CS, linking them with their frequency. The CS may be constructed weekly or monthly according to an article collection period.

In other words, while the BS that is constructed by the preprocessing part 110 maintains nouns, appearing in articles collected weekly during a period in the past when an event having great social impact has not occurred, and their frequency, the CS maintains nouns having high frequency that are extracted from articles collected weekly after the period in the past. Accordingly, by comparing the CS that is constructed weekly with the BS that is constructed initially, whether an event having great social impact or influence occurs in this week may be identified.

An attention part 120 may select a certain number of nouns Nc to be noted in this week from the CS by comparing nouns and their frequency in the CS that is constructed weekly with nouns and their frequency in the BS and may construct an AS including the selected nouns Nc and their frequency.

As a criterion for selecting the nouns Nc, the attention part 120 may select nouns that are not included in the BS among the nouns in the CS as the nouns Nc to be included in the AS.

For example, when a noun is included in the CS but is not included in the BS, the noun has a high frequency in the top 5% in this week but is not included in the BS, and thus it may be determined that the noun is likely an important noun related to an event/atmosphere having great social impact in this week.

In operation 205, the attention part 120 may verify whether a noun recorded in the CS that is constructed weekly is also recorded in the BS.

As a verification result in operation 205, when the noun is not recorded in the BS (false in operation 205), the attention part 120 may maintain the noun recorded in the CS as an important word to be noted in the week together with its frequency in the AS in operation 206.

While the BS is a space where nouns having top 5% frequency among all nouns appearing in articles in the past are maintained, and the CS is a space where nouns having the top 5% frequency among all nouns appearing in articles collected weekly and their frequency are maintained, the AS may be a space where nouns to be used for analysis to deduce a social impact of the week among nouns in the CS constructed weekly and their frequency are maintained.

As another criterion for selecting the nouns Nc, when there is a noun that is also included in the BS among the nouns in the CS, the attention part 120 may select the noun as the noun Nc to be included in the AS when the frequency of the noun in the CS increases by a reference value or more compared to the frequency of the noun in the BS.

For example, although a noun in the CS that is also included in the BS is not a word newly appearing this week, when the frequency of the noun appearing in articles collected this week shows a definite increase compared to the frequency of the noun appearing in articles in the past, the noun may also be viewed as an important noun related to an event/atmosphere having great social impact this week.

In summary, among the nouns in the CS, a noun satisfying at least one of two conditions below may be included in the AS:

(1) where a noun in the CS is not included in the BS; and (2) where a noun in the CS is included in the BS, but a frequency increase compared to the past is greater than or equal to a certain rate (X %).

In other words, according to whether nouns are mentioned only in articles this week and whether the nouns satisfy the above condition on the number of times the nouns are mentioned (frequency), the attention part 120 may select nouns to be noted this week and may construct the AS, which is a set of nouns (including their frequency) to be used to deduce a social impact in an extraction part 130 described below.

As a verification result in operation 205, when a noun recorded in the CS constructed weekly is also recorded in the BS (true in operation 205), the attention part 120 may verify whether the frequency (how many times the noun is mentioned this week) of the noun that is both in the CS and the BS is determined to be an outlier that is beyond a reference value from an average according to the '3 sigma rule' in operation 207.

As a verification result in operation 207, when the weekly frequency of the noun in the CS is determined to be the outlier that is beyond the reference value from the weekly average frequency of the noun in the BS (false in operation 207), the attention part 120 may add the noun to the AS as the noun to be noted in the week.

On the other hand, when the weekly frequency of the noun in the CS is within the reference value from the weekly average frequency (true in operation 207), the attention part 120 may skip (pass) the addition of the noun to the AS in operation 208.

In this case, the '3 sigma rule' refers to defining data outside "±standard deviation*sigma coefficient" from an average of data as an outlier, and the sigma coefficient may be generally set as '2' or '3'. The 3 sigma rule is described in detail below with reference to FIG. 9.

Figure 9:
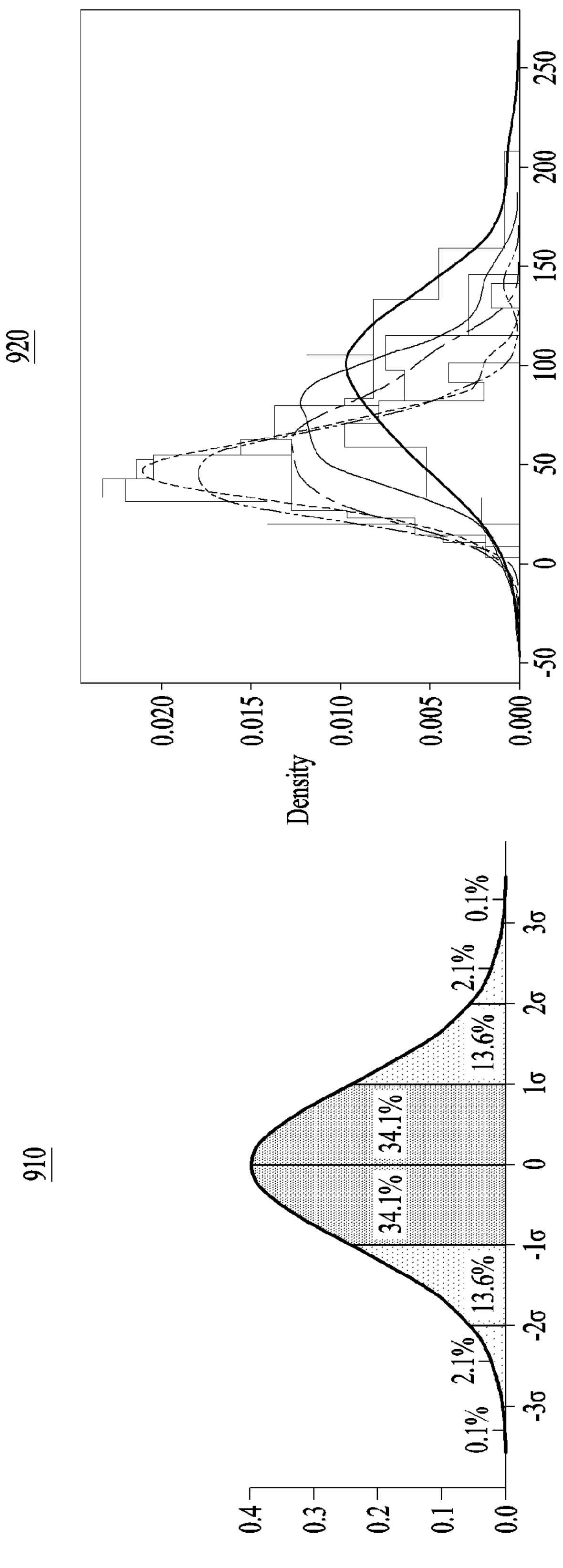
FIG. 9 is a diagram illustrating a data distribution graph showing the '3 sigma rule' in the text data-based system for deducing a social impact according to an embodiment.

FIG. 9 is a diagram illustrating a data distribution graph showing the '3 sigma rule' in the text data-based system for deducing a social impact according to an embodiment.

Referring to FIG. 9, when the distribution of whole data is illustrated as a graph 910, and the sigma coefficient is '2', data that is distributed away from an average of the whole data by "±standard deviation*2" is determined to be the outlier, and in this case, a proportion of data classified into the outlier of the whole data may be about 4.2%.

For example, when applying the '3 sigma rule' to "port", a noun that is both in the CS and BS, under the assumption that the weekly average frequency (how many times the noun is mentioned) of the noun "port" in the BS is '50', the standard deviation is '+10', and the sigma coefficient is '3', frequency that is less than 50−(10*3)=20 or greater than 50+(10*3)=80, which is a point away from the weekly average frequency ('50') by "±10*3", may be determined to be the outlier.

Accordingly, when the frequency (how many times the noun is mentioned) of the noun "port" in the CS is measured as, for example, '90', which is greater than '80', an outlier determination standard, the attention part 120 may determine the noun "port" in the CS to be the outlier and may add the noun with its frequency ('90') to the AS.

For another example, the number of approximately 1,000 nouns being mentioned in a week may be recorded in the BS by using actual experimental data collected during a certain period in the past. The attention part 120 may calculate an average and standard deviation of the number of all nouns in the BS that are mentioned in the week and may illustrate, as a graph 920, a distribution of each of the top five nouns ("port", "logistics", "Incheon", "corporation", and "business") having a high number (frequency) of being mentioned in the week by using the calculated average and standard deviation.

For the noun "port" having the highest weekly average mentioned amount, '50.11', in the graph 920, when the standard deviation thereof is calculated as '21.69', and a sigma coefficient thereof is assumed to be '3', the number (frequency) of the noun "port" being mentioned in the CS constructed by using the experimental data collected in the week may have to be greater than or equal to "50.11+21.69*3=115 times" such that the noun is determined to be the outlier defined in the '3 sigma rule' and may be added to the AS.

In other words, for a noun that is both in the CS and the BS to be added to the AS, the times that the noun is mentioned in a week in the CS may need to be greater than or equal to a value (e.g., 115 times) exceeding the times that the noun is mentioned in the week in the BS by the reference value ("standard deviation*sigma coefficient"), and only then the noun may be recorded in the AS.

When the AS in which the nouns to be noted in this week and their frequency (how many times the nouns are mentioned) are recorded is constructed in operation 206, the extraction part 130 may extract top n (e.g., 10) nouns having high frequency from the AS and may determine a final AS including the extracted n nouns and their frequency in operation 209 and may proceed with a procedure for deducing a social impact by using the determined AS in operations 210 to 214.

The extraction part 130 may construct an adjacency matrix between n nouns in the determined AS in operation 210, may calculate a weight (hereinafter, an NF-LF weight) using the NF-LF technique proposed in the present disclosure in operation 211, may construct an NF-LF adjacency matrix by combining the NF-LF weight with the adjacency matrix through matrix multiplication in operation 212, may calculate a PageRank score by applying a PageRank algorithm to the NF-LF adjacency matrix in operation 213, and may deduce a social impact by applying the PR-MAS technique proposed in the present disclosure to the calculated PageRank score in operation 214.

The process of deducing a social impact in the extraction part 130 is described in detail below with reference to FIGS. 3 to 7.

FIG. 3 is a diagram illustrating an example of constructing an AS and an adjacency matrix in the text data-based system for deducing a social impact according to an embodiment.

Referring to FIG. 3, the extraction part 130 may determine an AS 310 by extracting the top 10 frequent nouns from an AS, constructed by the attention part 120, in which nouns to be noted in a week and their frequency are recorded.

When the top 10 nouns ("COVID-19", "crises", "basic industry", "solidarity", "order", "POSCO", "truck", "parcels truck", "equality", and "ranking") corresponding to a selected week (4th week of April 2021) in the AS 310 are respectively arranged in rows and columns, the extraction part 130 may construct an adjacency matrix 320 by having the number of respective nouns in respective rows and columns appearing/being mentioned together in articles collected in the week as a value of the respective rows and columns.

In other words, the adjacency matrix 320 may indicate how many times a noun in a column appears in articles when a noun in a row appears in the articles. For example, a matrix value '33.0' where a "COVID-19" row intersects with a "crisis" column of the adjacency matrix 320 may mean that the word "crisis" appears in articles 33 times together with the word "COVID-19" when the word "COVID-19" appears in the articles.

FIG. 4 is a diagram illustrating an example of adjusting an adjacency matrix by using an NF-LF weight in the text data-based system for deducing a social impact according to an embodiment.

Referring to FIG. 4, the extraction part 130, for each noun i in the adjacency matrix 320 constructed in FIG. 3, may calculate the NF-LF weight NFLF(i) according to the NF-LF technique proposed in the present disclosure, may combine the NF-LF weight NFLF(i) with the adjacency matrix 320 constructed in FIG. 3 through matrix multiplication, and may construct an NF-LF adjacency matrix 420 adjusted by the NF-LF weight NFLF(i).

First, the extraction part 130 may count the frequency of each noun i appearing in one article d by applying an NF function to each noun i in the adjacency matrix 320 constructed in FIG. 3 and may output an NF(i) for each noun i by summing the counted frequency and whole articles D collected during a week.

In other words, the NF(i) may refer to the sum of the frequency of each noun i appearing in the whole articles D, and in this case, the frequency counted in the article d may be limited up to 3.

In addition, the extraction part 130 may count, as '1' or '0', an LF between each noun i and another noun i+1 according to whether the noun i appears together with the other i+1 in the article d by applying an LF function to each noun i in the adjacency matrix constructed in FIG. 3 and may output an LF(i) for nouns (i) by concatenating a sum by log 2 after summing the counted LF for all the nouns i and i+1 (LF(i)=log 2(total LF of nouns (i)).

For example, the extraction part 130 may count, as '1', the LF between the nouns i and i+1 by determining that there is a link from the noun i→the other noun i+1 when the article d in which the nouns i and i+1 appear together is verified among the collected whole articles D (that is, the frequency of them appearing together is counted as '1' or more).

On the other hand, the extraction part 130 may count, as '0', the LF between the nouns i and i+2 by determining that there is no link from the noun i→the noun i+2 when the nouns i and i+2 never appear together in any of the collected whole articles D (that is, the frequency of them appearing together is counted as '0').

The extraction part 130 may output the LF(i) for the noun i by concatenating a sum of LFs for the noun i obtained by repeating the process for the noun i and each of the 9 remaining nouns in the adjacency matrix 320.

As described above, when the NF(i) and LF(i) for each noun i in the adjacency matrix 320 are obtained, in which the NF(i) is the sum of the frequency of each noun i appearing in the whole article D, and the LF(i) is related to an LF when each noun i appears together with another noun, the extraction part 130 may divide a value obtained by multiplying the NF(i) for each noun i by the LF(i) for each noun i by the number of the whole articles D and may calculate the NF-LF weight, NFLF(i), 410 for each noun i according to Equation 1 (refer to Equation 1).

Unlike a weight (importance) based on simply how many times a word is mentioned, which is used in the conventional TF-IDF, the NF-LF weight 410 may be calculated by using an LF indicating how many other nouns a noun appears together with other than an NF of the noun appearing in whole articles.

Accordingly, the extraction part 130 may perform matrix multiplication with the NF-LF weight 410 on the adjacency matrix 320 of FIG. 3 having the frequency of another noun appearing together with each noun arranged in a row and a column and amplify the frequency, which is each matrix value in the adjacency matrix 320, by the NF-LF weight 410.

Accordingly, the frequency of the noun "COVID-19" appearing together with the noun "crisis" in the NF-LF adjacency matrix 420 of FIG. 4 may be amplified by a value, '183.063', obtained by multiplying the frequency, '33', of the noun "COVID-19" appearing together with the noun "crisis" in the adjacency matrix 320 of FIG. 3 by the NF-LF weight 410, calculated in FIG. 4, of the noun "COVID-19".

Among 10 nouns, the noun "COVID-19" has a greater NF, which is the total frequency of the noun appearing in whole articles collected in a week, and a greater LF, which is the total links with other nouns mentioned together with the noun, than the number of the whole articles, and thus the NF-LF weight 410 may be calculated as the highest value, '5.547', that is greater than or equal to '1', and the noun may be determined to be an important noun.

On the other hand, a noun "order" has an NF, which is the total frequency of the noun appearing in whole articles in the week, and an LF, which is the total links with other nouns mentioned together with the noun, less than the number of the whole articles, and thus the NF-LF weight 410 is calculated as a small value, '0.375', that is less than '1', and the noun may be determined to be an unimportant noun.

As described above, by applying the weight 410 using the NF and the LF to the adjacency matrix 320 of FIG. 3, the frequency (that is, the number of links from "COVID-19"-"crisis"), '33.0', of "COVID-19", which is an important noun having a high appearance frequency in the whole articles, appearing together with the noun "crisis" may increase to '183.063', like the NF-LF adjacency matrix 420 of FIG. 4, however, the frequency (that is, the number of links from "order"→"crisis"), '3.0', of "order", which is an unimportant noun, appearing together with the noun "crisis" may rather decrease to '1.125', like the NF-LF adjacency matrix 420 of FIG. 4.

In other words, the NF-LF adjacency matrix 420 may be adjusted by the NF-LF weight 410 such that a frequency (the number of links) of a noun linked to an important noun in the adjacency matrix 320 may increase, and a frequency (the number of links) of a noun linked to an unimportant noun may decrease.

By performing PageRank score calculation to be described below by using the NF-LF adjacency matrix 420 adjusted by the NF-LF weight 410, the present disclosure may effectively extract a keyword (e.g., "COVID-19" or "crises") estimated to be related to an event having a social impact or a social atmosphere during a collection period (week/month) of text data from the text data (e.g., Internet news articles) collected regularly (weekly/monthly) over time by using 1) the importance, changing over time, of words or 2) a weight changing according to a linking state between words, such as a word linked to an important word or a word linked to an unimportant word and may calculate a text-data based quantified value, a PR-MAS, to deduce the event having a social impact or the social atmosphere (social shock or external impact) by applying the PR-MAS technique.

The process of calculating a PageRank score and calculating a PR-MAS value for deducing a social impact by using the NF-LF adjacency matrix 420 to which the NF-LF weight 410 of each noun is applied is described below.

The extraction part 130 may calculate a PageRank score of each noun by applying a PageRank algorithm to the NF-LF adjacency matrix 420 and may calculate the PR-MAS value for deducing a social impact by applying the PR-MAS technique proposed in the present disclosure to the calculated PageRank score.

In this case, the PageRank algorithm is a method of assigning a weight, according to relative importance, to documents having a hyperlink structure, such as a world wide web, which is an algorithm used for googling to measure/identify the importance of a webpage.

FIG. 5 is a diagram illustrating a PageRank algorithm in the text data-based system for deducing a social impact according to an embodiment.

Referring to FIG. 5, to identify the influence between nouns linked to one another, a PageRank power iteration technique may be used herein.

In this case, the nouns linked to one another may be a noun i and a noun i+1 having a frequency greater than or equal to '1' of them appearing together in whole articles D collected in a week, and there is a link from the noun i→the noun i+1.

Under the assumption that there is a link between four nouns A, B, C, and D, like a graph 500, a probability matrix 510 may be configured through the graph 500.

In the graph 500, since the noun A has links to the nouns B and C but does not have links to the nouns A and D, a probability value of the first row of the probability matrix 510 may be set as "0(A→A), 0.5(A→B), 0.5(A→C), 0(A→D)". In the graph 500, since the nouns B and D each only have a link to the noun A, a probability value of each of the second and fourth rows of the probability matrix 510 may be set as "1 0 0 0". In the graph 500, since the noun C has links to the nouns B, C, and D, a probability value of the third row of the probability matrix 510 may be set as "0.33 0.33 0 0.33".

Through this process, the extraction part 130 may construct the probability matrix 510 according to whether there is a link between 10 nouns in an AS (step 2. Configure the probability matrix 510).

Prior to this, the extraction part 130 may prepare an initial PageRank score 501, in which a score of each of all 10 nouns in the AS is set as, for example, '0.25' (step 1. Set the initial PageRank score 501).

The extraction part 130 may repeat a process of updating the score of each of 10 nouns in the AS by using a score [0.582 0.208 0.125 0.083] 502 obtained by performing matrix multiplication of the initial PageRank score 501 with the probability matrix 510 and updating the score of each of 10 nouns again by using a score [0.331 0.332 0.291 0.041] 503 obtained by performing matrix multiplication of the updated score [0.582 0.208 0.125 0.083] 502 with the probability matrix 510 again until converging to a set value (step 3. Repeat until PageRank converges).

Figure 6:
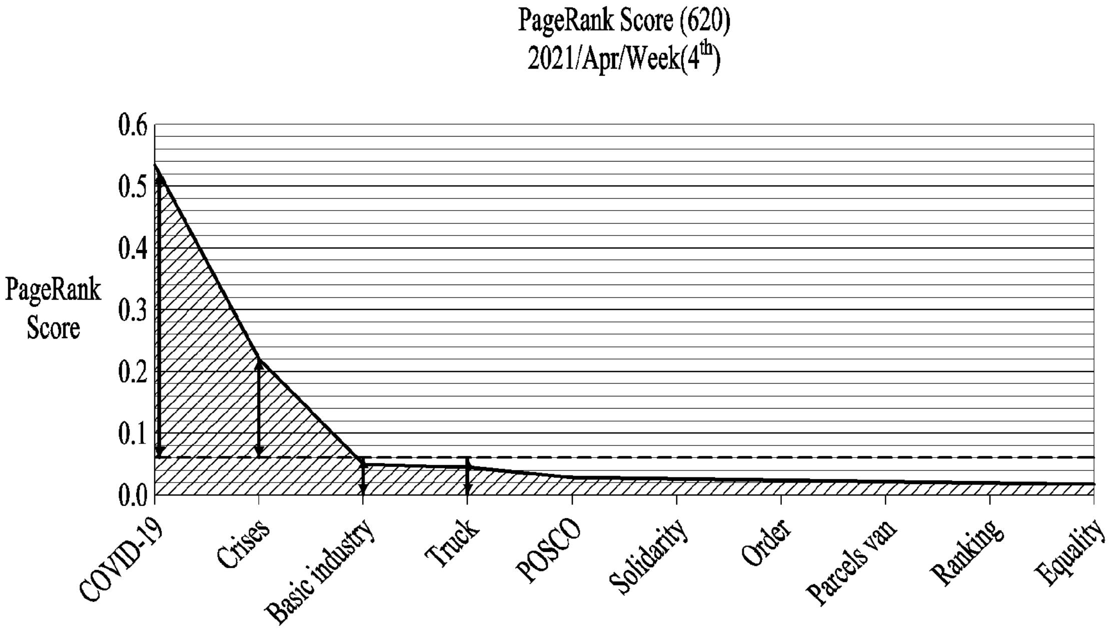
FIG. 6 is a diagram illustrating an example of calculating a PageRank score by applying a PageRank algorithm in the text data-based system for deducing a social impact according to an embodiment.

FIG. 6 is a diagram illustrating an example of calculating a PageRank score by applying a PageRank algorithm in the text data-based system for deducing a social impact according to an embodiment.

In FIG. 6, a table 610 and a graph 620 illustrate a PageRank score calculated by using a power iteration technique of PageRank illustrated in FIG. 5 for 10 nouns ("COVID-19", "crisis", "basic industry", "solidarity", "order", "POSCO", "truck", "parcels truck", "equality", and "ranking") in an AS.

Referring to the table 610 and the graph 620, a noun (e.g., "COVID-19" and "crisis") having a high PageRank score, compared to a noun (e.g., "basic industry", "truck", etc.) having a low PageRank score, may be more likely determined to be an important noun related to an event/atmosphere having great social impact during a collection period (4th week of April 2021) of articles. In other words, the nouns "COVID-19" and "crisis" may be determined to have high social impact based on articles collected during the 4th week of April 2021.

The extraction part 130 may sum a difference value between a PageRank score, calculated for nouns in the AS, of each noun and an average value of PageRank scores and may calculate a PR-MAS to identify a change over time in a social impact of each noun (refer to Equation 2).

For example, the extraction part 130 may calculate a PageRank score average value as approximately '0.1' by using the PageRank scores of 10 nouns in the table 610 of FIG. 6 and may obtain '1.111' as the PR-MAS by summing absolute values of differences between each of the PageRank scores of 10 nouns and the average value of '0.1'. A greater PR-MAS value may indicate that a word having greater social influence (impact) appears/is mentioned in a week when articles are collected.

Figure 7:
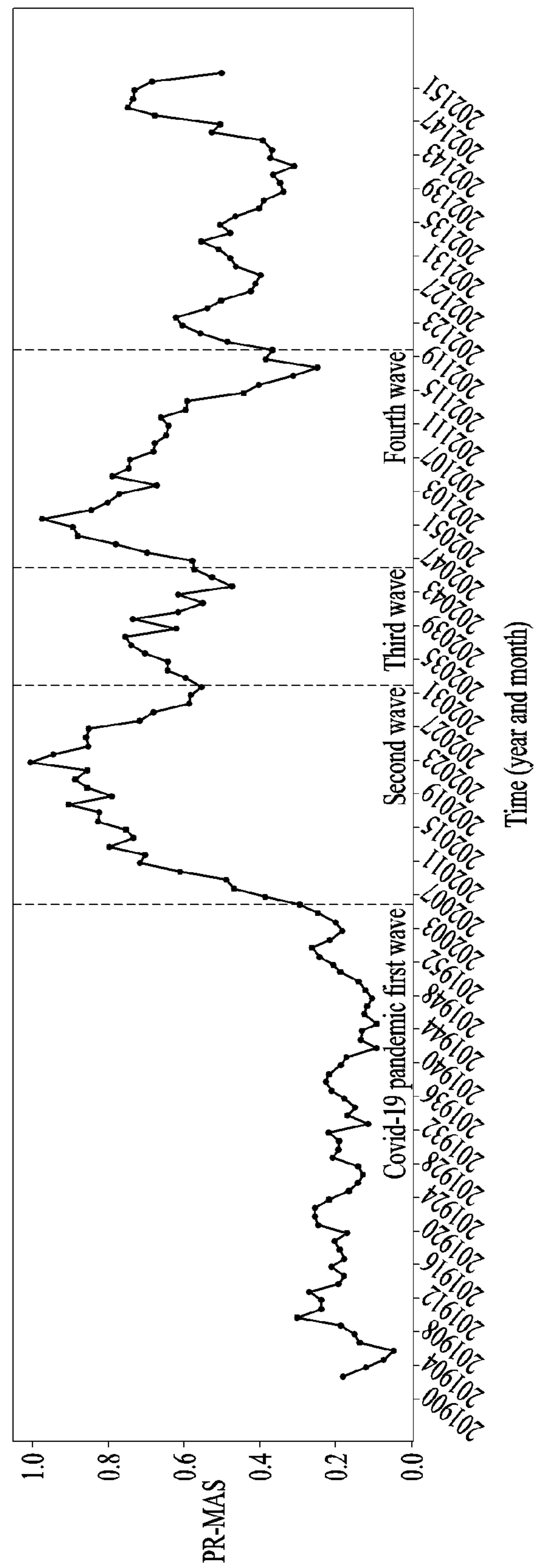
FIG. 7 is a diagram illustrating a graph showing a change, over time, of a PageRank Mean Absolute Sum (PR-MAS) value in the text data-based system for deducing a social impact according to an embodiment.

FIG. 7 is a diagram illustrating a graph showing a change, over time, of a PR-MAS value in the text data-based system for deducing a social impact according to an embodiment.

FIG. 7 illustrates a graph 700 showing that a change, over time, of a PR-MAS value calculated by using data crawled in each month from MaritimePress from 2016 to 2021. Referring to the graph 700, the PR-MAS value sharply increases during the first to fourth waves of the COVID-19 pandemic.

According to the present disclosure, by using keywords extracted from text data (e.g., articles, webpages, etc.) and a PR-MAS result value obtained from the extracted keywords, an event or social atmosphere having a social impact or information on market psychology may be estimated, which enables cause analysis and preemptive response, and the performance of a neural network may also be expected to be improved.

Figure 8:
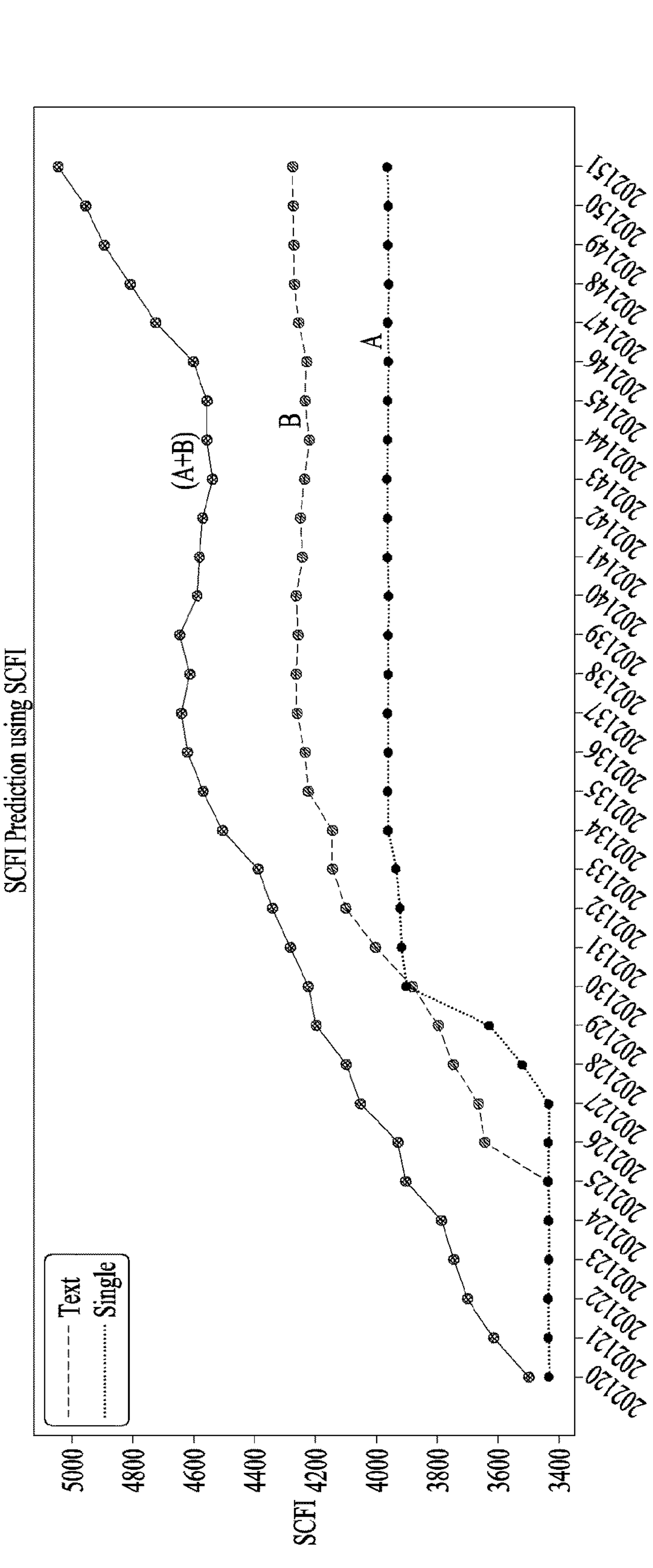
FIG. 8 is a diagram illustrating a graph of a performance verification result when applying PR-MAS proposed in the text data-based system for deducing a social impact according to an embodiment.

FIG. 8 is a diagram illustrating a graph of a performance verification result when applying PR-MAS proposed in the text data-based system for deducing a social impact according to an embodiment.

Referring to FIG. 8, in the present disclosure, by using the Shanghai Containerized Freight Index (SCFI) for about 2 years from April 2020 to December 2021 as experimental data and a recurrent neural network (RNN) model, a performance comparison experiment is conducted on a case where only the SCFI is used and a case where a mix of the SCFI and weekly PR-MAS data proposed herein is used. A mean squared error (MSE) and a mean absolute error (MAE) are used as a performance evaluation indicator.

In this case, training data for the RNN model may be set to predict a SCFI next week by using a SCFI for the previous four weeks as a variable, and a univariate RNN model is applied to a case A where only the SCFI is used while a multivariate RNN model, to which the SCFI and the PR-MAS are each set as an independent variable, is applied to a case A+B where a mix of SCFI+PR-MAS is used.

A graph 810 of FIG. 8 includes the case A where only the SCFI is used, a case B where the PR-MAS proposed in the present disclosure is only used, and the case A+B where the mix of the SCFI and the PR-MAS is used, and a table 820 of FIG. 8 includes MSE and MAE values in the case A where only the SCFI is used and MSE and MAE values in the case A+B where the mix of the SCFI and the PR-MAS is used.

It is visually verifiable that the performance of the case A+B where the mix of the SCFI and the PR-MAS is used is gradually improved over time compared to the performance of the case A where only the SCFI is used in the graph 810. In the table 820, also, as a performance verification result, the MSE and MAE values of the case A+B where the mix of the SCFI and the PR-MAS is used shows that there is approximately 54% of performance improvement compared to the case A where only the SCFI is used to which the univariate RNN model is applied.

The methods according to the above-described examples may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of embodiments have been described above. Nevertheless, it should be understood that various modifications may be made to these embodiments. Suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

What is claimed is:

1. A text data-based method of deducing a social impact, the text data-based method comprising:

constructing a base set comprising nouns extracted from text data by preprocessing the text data collected for a certain period among a whole predetermined period;

constructing a compare set comprising nouns extracted from first text data by preprocessing the first text data collected for a certain period after constructing the base set;

constructing an attention set by selecting a noun to be noted during a collection period of the first text data from the compare set based on the base set;

deducing a numerical value, a PageRank Mean Absolute Sum (PR-MAS), of social impact, that is, an index indicating a degree to which a noun associated with an event having social impact is used for the collection period of the first text data by using the attention set, determining the attention set by extracting a certain number of nouns NA in an order from a noun having a highest appearance frequency in the first text data among nouns in the attention set; and generating an adjacency matrix by counting the frequency of a noun in a row and a noun in a column appearing together in the first text data and having a counted frequency as a value of the row and the column when arranging the certain number of nouns NA of the determined attention set in the row and the column, wherein the deducing the numerical value, the PR-MAS, comprises deducing the numerical value, the PR-MAS, of social impact by using the adjacency matrix; and wherein the deducing the social impact comprises:

calculating a total noun frequency (NF), that is, a total appearance frequency of each noun NA, in the first text data by applying an NF function to each noun NA in the adjacency matrix;

calculating a link frequency (LF) with another noun NA appearing together with each noun NA among the certain number of nouns NA in the first text data by applying an LF function to each noun NA in the adjacency matrix;

calculating an NF-LF weight for each of the certain number of nouns NA according to following Equation 1:

$$NFLF(i) = \frac{LF(i) * NF(i)}{\text{sum of documents}}, \quad \text{Equation 1}$$

where NF(i) denotes a total appearance frequency of each noun i, LF(i) denotes an LF between other nouns appearing together with each noun i, and NFLF(i) denotes an NF-LF weight for each noun i; and generating an NF-LF adjacency matrix by combining the NF-LF weight with the adjacency matrix through matrix multiplication.

2. The text data-based method of claim 1, wherein the constructing the attention set comprises:

verifying whether a first noun comprised in the compare set is also comprised in the base set; and selecting the first noun as the noun to be noted when the first noun is not comprised in the base set.

3. The text data-based method of claim 2, wherein an appearance frequency of the first noun in the text data is recorded in the base set, and the appearance frequency of the first noun in the first text data is recorded in the compare set, and when the first noun comprised in the compare set is also comprised in the base set, the constructing the attention set further comprises:

verifying whether the appearance frequency of the first noun recorded in the compare set exceeds the appearance frequency of the first noun recorded in the base set by a reference value or more; and when the appearance frequency in the compare set exceeds the appearance frequency in the base set by the reference value or more, selecting the first noun as the noun to be noted.

4. The text data-based method of claim 3, wherein the constructing the attention set further comprises:

calculating an average and a standard deviation by using the appearance frequency of the first noun recorded in the base set;

calculating a minimum reference value when the appearance frequency of the first noun is determined to be an outlier by applying a sigma coefficient provided in the '3 sigma rule' to the average and the standard deviation; and selecting the first noun as the noun to be noted when the appearance frequency of the first noun recorded in the compare set exceeds the minimum reference value.

5. The text data-based method of claim 1, wherein the deducing the numerical value, the PR-MAS, of social impact by using the adjacency matrix comprises:

calculating a PageRank score for each of the certain number of nouns NA by applying a PageRank algorithm to the NF-LF adjacency matrix; and deducing the numerical value, the PR-MAS, of social impact according to following Equation 2:

$$PR-MAS = \sum_{i=1}^{\{Score \in PR\}} |\text{Score} - \mu(PR)|, \quad \text{Equation 2}$$

where PR denotes a PageRank score set, Score denotes a PageRank score of each noun, and μ(PR) denotes an average value of PageRank scores of all nouns.

6. The text data-based method of claim 1, wherein the constructing the base set comprises:

correcting spelling and spacing for each text data collected for a certain period by using a tool for removing a punctuation mark and a tool for processing a natural language;

tagging a part of speech by using the tool for processing a natural language on each word in text data that is corrected;

extracting nouns among words tagged with a part of speech and counting an appearance frequency of the extracted nouns in the text data; and constructing the base set by selecting a certain number of nouns in an order from a noun having the highest appearance frequency among the extracted nouns.

7. The text data-based method of claim 1, wherein, whenever collecting the first text data for a certain period after constructing the base set, the constructing the compare set comprises:

correcting spelling and spacing for the first text data by using a tool for removing a punctuation mark and a tool for processing a natural language;

tagging a part of speech by using the tool for processing a natural language on each word in the first text data;

extracting nouns among words tagged with a part of speech and counting an appearance frequency of the extracted nouns in the first text data; and constructing the compare set by selecting a certain number of nouns in an order from a noun having the highest appearance frequency among the extracted nouns.

8. A text data-based system for deducing a social impact, the text data-based system comprising:

a preprocessing part configured to construct a base set comprising nouns extracted from text data by preprocessing the text data collected for a certain period among a whole predetermined period and construct a compare set comprising nouns extracted from first text data by preprocessing the first text data collected for a certain period after constructing the base set;

an attention part configured to construct an attention set by selecting a noun to be noted during a collection period of the first text data from the compare set based on the base set; and an extraction part configured to deduce a numerical value, a PR-MAS, of social impact, that is, an index indicating a degree to which a noun associated with an event having social impact is used for the collection period of the first text data by using the attention set, wherein the extraction part is further configured to determine the attention set by extracting a certain number of nouns NA in an order from a noun having a highest appearance frequency in the first text data among nouns in the attention set constructed by the attention part, generate an adjacency matrix by counting the frequency of a noun in a row and a noun in a column appearing together in the first text data and having a counted frequency as a value of the row and the column when arranging the certain number of nouns NA of the determined attention set in the row and the column, and deduce the numerical value, the PR-MAS, of social impact by using the adjacency matrix; and wherein the extraction part is further configured to calculate a total noun frequency (NF), that is, a total appearance frequency of each noun NA, in the first text data by applying an NF function to each noun NA in the adjacency matrix, calculate a link frequency (LF) with another noun NA appearing together with each noun NA among the certain number of nouns NA in the first text data by applying an LF function to each noun NA in the adjacency matrix, calculate an NF-LF weight for each of the certain number of nouns NA according to following Equation 1;

$$NFLF(i) = \frac{LF(i) * NF(i)}{\text{sum of documents}}, \quad \text{Equation 1}$$

where NF(i) denotes a total appearance frequency of each noun i, LF(i) denotes an LF between other nouns appearing together with each noun i, and NFLF(i) denotes an NF-LF weight for each noun i, and generate an NF-LF adjacency matrix by combining the NF-LF weight with the adjacency matrix through matrix multiplication.

9. The text data-based system of claim 8, wherein the attention part is further configured to verify whether a first noun comprised in the compare set is also comprised in the base set, and select the first noun as the noun to be noted when the first noun is not comprised in the base set.

10. The text data-based system of claim 9, wherein an appearance frequency of the first noun in the text data is recorded in the base set, and the appearance frequency of the first noun in the first text data is recorded in the compare set, and the attention part is further configured to, when the first noun comprised in the compare set is also comprised in the base set, verify whether the appearance frequency of the first noun recorded in the compare set exceeds the appearance frequency of the first noun recorded in the base set by a reference value or more, and when the appearance frequency in the compare set exceeds the appearance frequency in the base set by the reference value or more, select the first noun as the noun to be noted.

11. The text data-based system of claim 10, wherein the attention part is further configured to calculate an average and a standard deviation by using the appearance frequency of the first noun recorded in the base set, calculate a minimum reference value when the appearance frequency of the first noun is determined to be an outlier by applying a sigma coefficient provided in the '3 sigma rule' to the average and the standard deviation, and select the first noun as the noun to be noted when the appearance frequency of the first noun recorded in the compare set exceeds the minimum reference value.

12. The text data-based system of claim 8, wherein the extraction part is further configured to calculate a PageRank score for each of the certain number of nouns NA by applying a PageRank algorithm to the NF-LF adjacency matrix, and deduce the numerical value, the PR-MAS, of social impact according to following Equation 2:

$$PR-MAS = \sum_{i=1}^{\{Score \in PR\}} |\text{Score} - \mu(PR)|, \quad \text{Equation 2}$$

where PR denotes a PageRank score set, Score denotes a PageRank score of each noun, and μ(PR) denotes an average value of PageRank scores of all nouns.

13. The text data-based system of claim 8, wherein the preprocessing part is further configured to correct spelling and spacing for each text data collected for a certain period by using a tool for removing a punctuation mark and a tool for processing a natural language, tag a part of speech by using the tool for processing a natural language on each word in text data that is corrected, extract nouns from among words tagged with a part of speech and count an appearance frequency of the extracted nouns in the text data, and construct the base set by selecting a certain number of nouns in an order from a noun having the highest appearance frequency among the extracted nouns.

14. The text data-based system of claim 8, wherein, whenever collecting the first text data for a certain period after constructing the base set, the preprocessing part is further configured to correct spelling and spacing for the first text data by using a tool for removing a punctuation mark and a tool for processing a natural language, tag a part of speech by using the tool for processing a natural language on each word in the first text data, extract nouns from among words tagged with a part of speech and count an appearance frequency of the extracted nouns in the first text data, and construct the compare set by selecting a certain number of nouns in an order from a noun having the highest appearance frequency among the extracted nouns.

15. A non-transitory computer-readable storage medium storing a program for performing the text data-based method of claim 1.

* * * * *